US012639898B2

(12) United States Patent (10) Patent No.: US 12,639,898 B2
Lin et al. (45) Date of Patent: May 26, 2026

(54) IMAGE QUALITY ADJUSTING METHOD AND HOST

(71) Applicant: HTC Corporation, Taoyuan City (TW)

(72) Inventors: Li-Wei Lin, Taoyuan City (TW);
Chia-Cheng Tsai, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 190 days.

(21) Appl. No.: 18/516,950

(22) Filed: Nov. 22, 2023

(65) Prior Publication Data

US 2024/0242448 A1 Jul. 18, 2024

Related U.S. Application Data

(60) Provisional application No. 63/439,580, filed on Jan. 18, 2023.

(51) Int. Cl.
| | |
|---|---|
| *G06T 19/00* | (2011.01) |
| *G06T 1/20* | (2006.01) |
| *G06T 3/40* | (2024.01) |
| *G06T 5/73* | (2024.01) |
| *G06V 20/20* | (2022.01) |

(52) U.S. Cl.
CPC ............. *G06T 19/006* (2013.01); *G06T 1/20* (2013.01); *G06T 3/40* (2013.01); *G06T 5/73* (2024.01); *G06V 20/20* (2022.01); *G06T 2207/30168* (2013.01)

(58) Field of Classification Search
CPC ........... G06T 19/006; G06T 1/20; G06T 3/40; G06T 5/73; G06T 2207/30168; G06V 20/20; H04N 21/25858; H04N 21/2662; H04N 21/42653; H04N 21/443

USPC .......................................................... 345/633
See application file for complete search history.

(56) References Cited

U.S. PATENT DOCUMENTS

| | | | | |
|---|---|---|---|---|
| 9,936,208 | B1 * | 4/2018 | Brailovskiy | ........... H04N 19/59 |
| 2007/0242086 | A1 * | 10/2007 | Tsujimoto | ............. G06T 19/006 |
| | | | | 345/632 |
| 2017/0155937 | A1 * | 6/2017 | Zhang | .................... H04L 67/565 |
| 2020/0409457 | A1 * | 12/2020 | Terrano | ................ G02B 27/017 |

FOREIGN PATENT DOCUMENTS

| | | |
|---|---|---|
| CN | 109800141 | 8/2020 |
| TW | I622957 | 5/2018 |

OTHER PUBLICATIONS

"Office Action of Taiwan Counterpart Application", issued on Aug. 1, 2024, p. 1-p. 6.

* cited by examiner

*Primary Examiner* — James A Thompson
*Assistant Examiner* — Kim Thanh T Tran
(74) *Attorney, Agent, or Firm* — JCIPRNET

(57) ABSTRACT

The embodiments of the disclosure provide an image quality adjusting method and a host. The method includes: providing, by a host, a visual content, wherein the visual content comprises a pass-through image; obtaining, by the host, a frame rate of the visual content and a loading of a graphic processing unit of the host; and dynamically adjusting, by the host, an image quality of the pass-through image based on the frame rate and the loading of the graphic processing unit of the host.

12 Claims, 3 Drawing Sheets

IMAGE QUALITY ADJUSTING METHOD AND HOST

CROSS-REFERENCE TO RELATED APPLICATION

This application claims the priority benefit of U.S. provisional application Ser. No. 63/439,580, filed on Jan. 18, 2023. The entirety of the above-mentioned patent application is hereby incorporated by reference herein and made a part of this specification.

BACKGROUND

1. Field of the Invention

The present disclosure generally relates to a computation resource management mechanism, in particular, to an image quality adjusting method and a host.

2. Description of Related Art

The application's frame rate, usually measured as Frames-Per-Second (FPS), plays a crucial role in the user experience of Mixed Reality (MR) applications. Even slight image juddering caused by an insufficient frame rate can lead to discomfort or motion sickness for users while interacting with the MR application.

The FPS of an MR application is primarily determined by two key factors: the device's performance capabilities and the computational demands imposed by the application itself. In the case of MR apps, rendering performance can be particularly challenging due to the additional requirement of displaying a pass-through image, which blends virtual and real-world elements seamlessly. Furthermore, the FPS of an app can vary across different scenes and scenarios, making it challenging to consistently maintain a high frame rate for the entire MR experience.

For MR applications that heavily tax the Graphics Processing Unit (GPU), one approach to improving FPS is to adjust the quality of the pass-through image. As mentioned earlier, FPS can vary between scenes, so it becomes necessary for developers to fine-tune the pass-through image quality settings for different scenes to strike the right balance between performance and visual quality.

SUMMARY OF THE INVENTION

Accordingly, the disclosure is directed to an image quality adjusting method and a host, which may be used to solve the above technical problems.

The embodiments of the disclosure provide an image quality adjusting method, including: providing, by a host, a visual content, wherein the visual content comprises a pass-through image; obtaining, by the host, a frame rate of the visual content and a loading of a graphic processing unit of the host; and dynamically adjusting, by the host, an image quality of the pass-through image based on the frame rate and the loading of the graphic processing unit of the host.

The embodiments of the disclosure provide a host, including a non-transitory storage circuit, a processor and a graphic processing unit. The storage circuit stores a program code. The processor is coupled to the non-transitory storage circuit and the graphic processing unit and accesses the program code to perform: providing a visual content, wherein the visual content comprises a pass-through image; obtaining a frame rate of the visual content and a loading of the graphic processing unit of the host; and dynamically adjusting an image quality of the pass-through image based on the frame rate and the loading of the graphic processing unit of the host.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
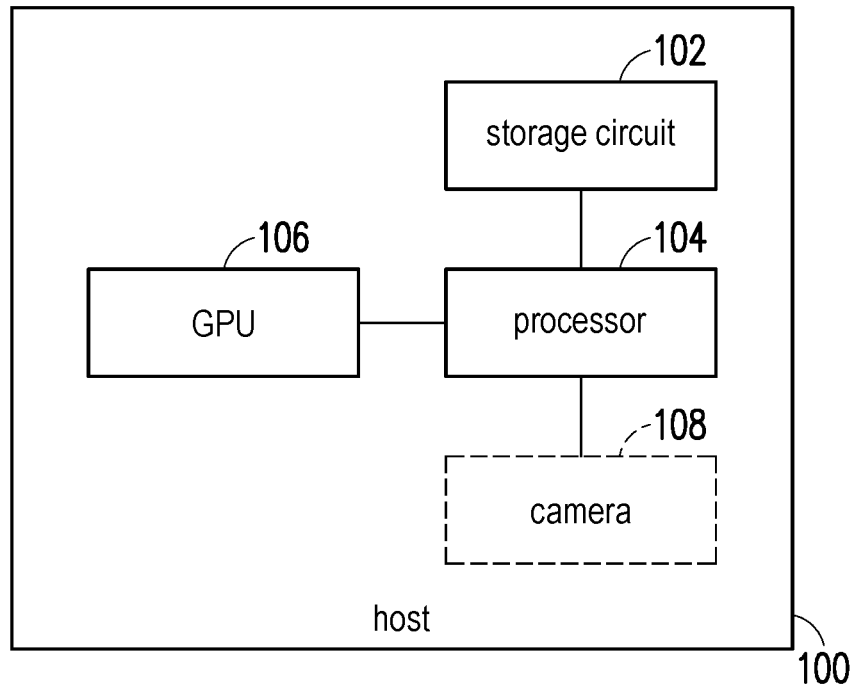
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In FIG. 1, the host 100 can be any electronic device such as smart devices and/or computer devices. In some embodiments, the host 100 can be a head-mounted display (HMD) that provides reality services such as MR services/contents for the user to experience.

In FIG. 1, the host 100 includes a storage circuit 102, a processor 104, and a GPU 106. The storage circuit 102 is one or a combination of a stationary or mobile random access memory (RAM), read-only memory (ROM), flash memory, hard disk, or any other similar device, and which records a plurality of modules that can be executed by the processor 104.

The processor 104 may be coupled with the storage circuit 102 and the GPU 106, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In some embodiments, the host 100 can further include one or more camera 108, which could be any camera having charge coupled device (CCD) lens, complementary metal oxide semiconductor transistors (CMOS) lens or infrared lens. In the embodiments of the disclosure, the camera 108 can be a front camera of the host 100, which can be used to capture the real-world scene in front of the user as an image. In one embodiment, the GPU 106 can render a pass-through image based on the captured image and show the rendered pass-through image as a part of the MR content.

In some embodiments, the host 100 can be connected with other external cameras that can provide the image of the real-world scene in front of the user to the host 100. In this case, the GPU 106 can render the pass-through image based on the image provided by the external cameras, but the disclosure is not limited thereto.

In the embodiments of the disclosure, the processor 104 may access the modules and/or the program code stored in the storage circuit 102 to implement the image quality adjusting method provided in the disclosure, which would be further discussed in the following.

Figure 2:
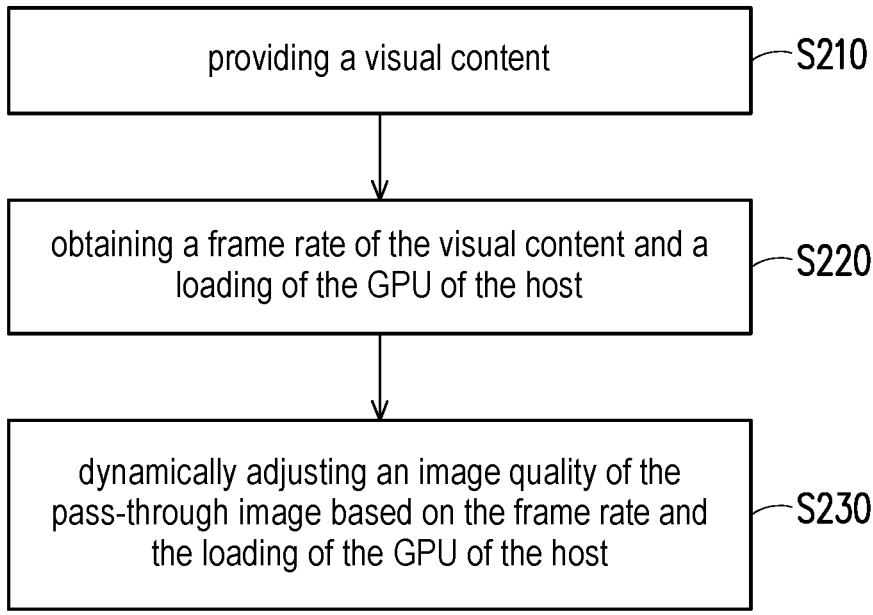
FIG. 2 shows a flow chart of the image quality adjusting method according to an embodiment of the disclosure.

See FIG. 2, which shows a flow chart of the image quality adjusting method according to an embodiment of the disclosure. The method of this embodiment may be executed by the host 100 in FIG. 1, and the details of each step in FIG. 2 will be described below with the components shown in FIG. 1.

In step S210, the processor 104 provides a visual content, wherein the visual content includes a pass-through image. In the embodiments of the disclosure, the visual content can be an MR content including the pass-through image and at least one rendered virtual object overlaying on the pass-through image. In this case, the pass-through image is used as an underlying image of the visual content.

In one embodiment, the pass-through image may be rendered by GPU 106 based on the image captured by, for example, the front camera of the host 100. In this case, the user wearing the host 100 (e.g., the HMD) can see the real-world scene in front of the user via the pass-through image in the visual content provided by the host 100.

In one embodiment, the GPU 106 may render one or more virtual object based on the MR application currently running on the host 100, and the processor 104 can overlay the rendered virtual object on the rendered pass-through image to form/generate the visual content (e.g., the MR content).

In step S220, the processor 104 obtains a frame rate of the visual content and a loading of the GPU 106 of the host 100. In step S230, the processor 104 dynamically adjusts an image quality of the pass-through image based on the frame rate and the loading of the GPU 106 of the host 100.

In the embodiments of the disclosure, the processor 104 can determine whether the frame rate is lower than a first frame rate threshold and whether the loading of the GPU 106 unit is higher than a first loading threshold, and accordingly adjust the image quality of the pass-through image.

Figure 3:
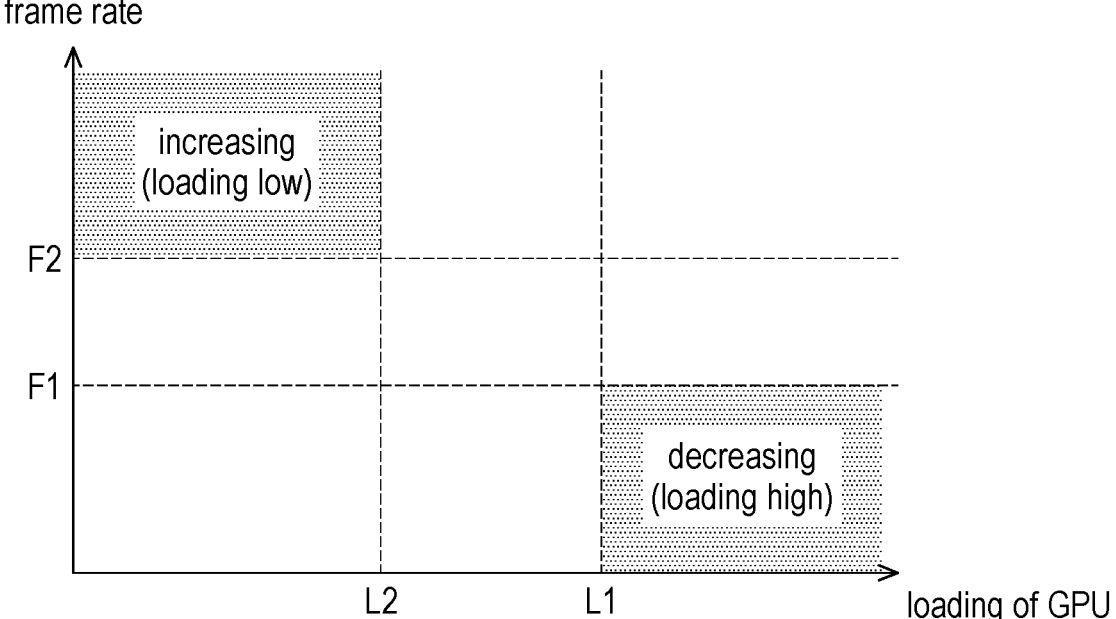
FIG. 3 shows a schematic diagram of adjusting the image quality of the pass-through image according to an embodiment of the disclosure.

For better understanding the concept of the disclosure, FIG. 3 would be used as an illustrative example, wherein FIG. 3 shows a schematic diagram of adjusting the image quality of the pass-through image according to an embodiment of the disclosure.

In a first embodiment, in response to determining that the frame rate is lower than a first frame rate threshold F1 and the loading of the GPU 106 is higher than a first loading threshold L1, the processor 104 decreases the image quality of the pass-through image.

In FIG. 3, if the frame rate is lower than the first frame rate threshold F1 and the loading of the GPU 106 is higher than the first loading threshold L1 (i.e., the combination of the frame rate and the loading of the GPU 106 corresponds to the region labelled with "decreasing" in FIG. 3), it represents that the loading of the MR application is high. In this case, the processor 104 can decrease the image quality of the pass-through image to ease the loading of the MR application, or otherwise the visual experience of the user may be deteriorated for the low frame rate.

In one embodiment, the image quality of the pass-through image may include at least one of a resolution, a sharpness, and a clarity of the pass-through image. In this case, the processor 104 may decrease the image quality of the pass-through image via, for example, controlling the GPU 106 to decrease at least one of a resolution, a sharpness, and a clarity of the pass-through image, but the disclosure is not limited thereto.

In some embodiments, the GPU 106 may be configured with a plurality of image quality levels, wherein each image quality level may be configured with different combination of resolution, sharpness, and clarity. In one embodiment, if the processor 104 determines to decrease the image quality of the pass-through image, the processor 104 may select the image quality level that corresponds to a lower resolution, sharpness, and/or clarity than that of the image quality level currently used by the GPU 106 and accordingly control the GPU 106 to switch to use the selected image quality level. In this case, the GPU 106 may render the pass-through image with a lower resolution, sharpness, and/or clarity, such that the image quality of the pass-through image can be decreased.

In one embodiment, in response to determining that the frame rate is not lower than the first frame rate threshold F1 or the loading of the GPU 106 is not higher than the first loading threshold L1, the processor 104 maintains or increases the image quality of the pass-through image.

In FIG. 3, if the frame rate is not lower than the first frame rate threshold F1 or the loading of the GPU 106 is not higher than the first loading threshold L1 (i.e., the combination of the frame rate and the loading of the GPU 106 corresponds to a region other than the region labelled with "decreasing" in FIG. 3), it represents that the loading of the MR application is not high. In this case, the processor 104 can maintain or increase the image quality of the pass-through image.

In one embodiment, the processor 104 can determine whether the frame rate is higher than a second frame rate threshold F2 and whether the loading of the GPU 106 is lower than a second loading threshold L2.

In a second embodiment, in response to determining that the frame rate is higher than the second frame rate threshold F2 and the loading of the GPU 106 is lower than the second loading threshold L2, the processor 104 may increase the image quality of the pass-through image.

In FIG. 3, if the frame rate is higher than the second frame rate threshold F2 and the loading of the GPU 106 is lower than the second loading threshold L2 (i.e., the combination of the frame rate and the loading of the GPU 106 corresponds to the region labelled with "increasing" in FIG. 3), it represents that the visual experience of the user may be improved since the GPU 106 is not heavily loaded. In this case, the processor 104 can increase the image quality of the pass-through image.

In one embodiment, if the processor 104 determines to increase the image quality of the pass-through image, the processor 104 may select the image quality level that corresponds to a higher resolution, sharpness, and/or clarity than that of the image quality level currently used by the GPU 106 and accordingly control the GPU 106 to switch to use the selected image quality level. In this case, the GPU 106 may render the pass-through image with a higher resolution, sharpness, and/or clarity, such that the image quality of the pass-through image can be increased.

In the second embodiment, in response to determining that the frame rate is not higher than the second frame rate threshold F2 or the loading of the GPU 106 is not higher than the first loading threshold L1, the processor 104 can maintain the image quality of the pass-through image.

In FIG. 3, if the frame rate is not higher than the second frame rate threshold F2 or the loading of the GPU 106 is not higher than the first loading threshold L1 (i.e., the combination of the frame rate and the loading of the GPU 106 corresponds to a region other than the regions labelled with "increasing" or "decreasing" in FIG. 3), it represents that the loading of the MR application is neither low nor high, and hence the processor 104 may maintain the image quality of the pass-through image by not adjusting the image quality level currently used by the GPU 106.

In some embodiments, the processor 104 may collect the instantaneous frame rates within a first duration and use the average of the collected frame rates as the frame rate considered in step S210. Likewise, the processor 104 may collect the instantaneous GPU loadings within a second duration and use the average of the collected GPU loadings as the loading of the GPU 106 considered in step S210.

In one embodiment, if the combination of the frame rate and the loading of the GPU 106 corresponds to the region labelled with "decreasing" in a case where the GPU 106 already uses the lowest image quality level for rendering the pass-through image, the processor 104 may maintain the image quality of the pass-through image. Likewise, if the combination of the frame rate and the loading of the GPU 106 corresponds to the region labelled with "increasing" in a case where the GPU 106 already uses the highest image quality level for rendering the pass-through image, the processor 104 may also maintain the image quality of the pass-through image.

In summary, the embodiments of the disclosure provide a solution to dynamically adjust the image quality of the pass-through image based on the frame rate and the loading of the GPU. If the combination of the frame rate and the loading of the GPU indicates that the loading of the MR application is high, the host can decrease the image quality of the pass-through image, such that the loading of the MR application can be eased. On the other hand, if the combination of the frame rate and the loading of the GPU indicates that the loading of the MR application is low, the host can increase the image quality of the pass-through image, such that the visual experience of the user can be improved. Accordingly, the rendering performance and the image quality of the pass-through image can be better balanced.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. An image quality adjusting method, comprising:
    capturing, by a host, a real-world scene in front of the host as an image;
    rendering, by the host, a pass-through image based on the image;
    providing, by the host, a visual content, wherein the visual content comprises the pass-through image, the visual content is a mixed reality content, the pass-through image is used as an underlying image of the visual content, and the visual content further comprises at least one rendered virtual object overlaying on the pass-through image;
    obtaining, by the host, a frame rate of the visual content and a loading of a graphic processing unit of the host; and
    dynamically adjusting, by the host, an image quality of the pass-through image based on the frame rate and the loading of the graphic processing unit of the host, comprising:

in response to determining that the frame rate is lower than a first frame rate threshold and the loading of the graphic processing unit is higher than a first loading threshold, decreasing the image quality of the pass-through image.

2. The method according to claim 1, wherein the step of dynamically adjusting the image quality of the pass-through image based on the frame rate and the loading of the graphic processing unit of the host further comprises:
    in response to determining that the frame rate is not lower than the first frame rate threshold or the loading of the graphic processing unit is not higher than the first loading threshold, maintaining or increasing the image quality of the pass-through image.

3. The method according to claim 2, wherein the step of maintaining or increasing the image quality of the pass-through image comprises:
    in response to determining that the frame rate is higher than a second frame rate threshold and the loading of the graphic processing unit is lower than a second loading threshold, increasing the image quality of the pass-through image.

4. The method according to claim 3, wherein the step of maintaining or increasing the image quality of the pass-through image further comprises:
    in response to determining that the frame rate is not higher than the second frame rate threshold or the loading of the graphic processing unit is not higher than the first loading threshold, maintaining the image quality of the pass-through image.

5. The method according to claim 1, wherein the step of dynamically adjusting the image quality of the pass-through image based on the frame rate and the loading of the graphic processing unit of the host comprises:
    in response to determining that the frame rate is higher than a second frame rate threshold and the loading of the graphic processing unit is lower than a second loading threshold, increasing the image quality of the pass-through image.

6. The method according to claim 1, wherein the image quality of the pass-through image comprises at least one of a resolution, a sharpness, and a clarity.

7. A host, comprising:
    a non-transitory storage circuit, storing a program code;
    a graphic processing unit; and
    a processor, coupled to the non-transitory storage circuit and the graphic processing unit and accessing the program code to perform:
    capturing a real-world scene in front of the host as an image;
    rendering a pass-through image based on the image;
    providing a visual content, wherein the visual content comprises the pass-through image, the visual content is a mixed reality content, the pass-through image is used as an underlying image of the visual content, and the visual content further comprises at least one rendered virtual object overlaying on the pass-through image;
    obtaining a frame rate of the visual content and a loading of the graphic processing unit of the host;
    dynamically adjusting an image quality of the pass-through image based on the frame rate and the loading of the graphic processing unit of the host; and
    in response to determining that the frame rate is lower than a first frame rate threshold and the loading of the graphic processing unit is higher than a first loading threshold, decreasing the image quality of the pass-through image.

8. The host according to claim 7, wherein the processor further performs:

in response to determining that the frame rate is not lower than the first frame rate threshold or the loading of the graphic processing unit is not higher than the first loading threshold, maintaining or increasing the image quality of the pass-through image.

9. The host according to claim 8, wherein the processor performs:

in response to determining that the frame rate is higher than a second frame rate threshold and the loading of the graphic processing unit is lower than a second loading threshold, increasing the image quality of the pass-through image.

10. The host according to claim 9, wherein the processor performs:

in response to determining that the frame rate is not higher than the second frame rate threshold or the loading of the graphic processing unit is not higher than the first loading threshold, maintaining the image quality of the pass-through image.

11. The host according to claim 7, wherein the processor performs:

in response to determining that the frame rate is higher than a second frame rate threshold and the loading of the graphic processing unit is lower than a second loading threshold, increasing the image quality of the pass-through image.

12. The host according to claim 7, wherein the image quality of the pass-through image comprises at least one of a resolution, a sharpness, and a clarity.

\* \* \* \* \*